(12) United States Patent
Dick

(10) Patent No.: US 7,775,545 B2
(45) Date of Patent: Aug. 17, 2010

(54) RETRACTABLE HITCH-BALL MECHANISM

(75) Inventor: Bernard L. Dick, Chanute, KS (US)

(73) Assignee: Young's Products, LLC, Chanute, KS (US)

( * ) Notice: Subject to any disclaimer, the term of this patent is extended or adjusted under 35 U.S.C. 154(b) by 34 days.

(21) Appl. No.: 12/045,529

(22) Filed: Mar. 10, 2008

(65) Prior Publication Data

US 2009/0224511 A1   Sep. 10, 2009

(51) Int. Cl.
*B60D 1/54* (2006.01)

(52) U.S. Cl. .................................................. 280/491.1

(58) Field of Classification Search ............. 280/290.1, 280/291.1; 227/63, 81, 116; 173/135, 170; 74/110, 53, 54, 55, 56
See application file for complete search history.

(56) References Cited

U.S. PATENT DOCUMENTS

| | | | |
|---|---|---|---|
| 3,031,206 A * | 4/1962 | Shinn | 280/433 |
| 3,126,209 A * | 3/1964 | Jewell et al. | 280/81.1 |
| 3,856,330 A | 12/1974 | Baxter et al. | |
| 3,870,342 A * | 3/1975 | Baxter et al. | 280/433 |
| 4,256,324 A | 3/1981 | Hamilton | |
| 4,570,966 A | 2/1986 | Giboney et al. | |
| 4,657,274 A | 4/1987 | Mann et al. | |
| 5,016,898 A | 5/1991 | Works et al. | |
| 5,092,147 A * | 3/1992 | Mochida et al. | 70/252 |
| 5,104,138 A | 4/1992 | Allen | |
| 5,143,393 A | 9/1992 | Meyer | |
| 5,242,186 A | 9/1993 | Pettersson | |
| 5,344,172 A | 9/1994 | Jaun | |
| 5,472,222 A | 12/1995 | Marcy | |
| 5,577,751 A | 11/1996 | Matthews | |
| D377,001 S | 12/1996 | Martin et al. | |
| 5,678,839 A | 10/1997 | Pobud, Jr. et al. | |
| 5,738,363 A | 4/1998 | Larkin | |
| 5,853,186 A | 12/1998 | Gentner et al. | |
| 5,860,671 A | 1/1999 | Mackeown | |
| 5,906,387 A | 5/1999 | Wallace | |
| 5,964,475 A | 10/1999 | Gentner et al. | |
| 6,409,202 B1 * | 6/2002 | Putnam | 280/495 |
| 6,447,000 B1 | 9/2002 | Dick et al. | |
| 6,533,308 B1 | 3/2003 | Tambornino | |
| 2004/0239074 A1 * | 12/2004 | Lindenman et al. | 280/491.1 |

* cited by examiner

*Primary Examiner*—Lesley Morris
*Assistant Examiner*—Daniel Yeagley
(74) *Attorney, Agent, or Firm*—Shook, Hardy & Bacon L.L.P.

(57) ABSTRACT

This invention is related to a retractable hitch-ball mechanism adapted for coupling to a frame of a vehicle, such as a pickup truck. The mechanism includes a support structure that is secured to the frame by a mounting-frame assembly, a housing having a tubular sleeve, a hitch ball member slidably disposed within the tubular sleeve, a drive plate, and a linkage coupled to the drive plate at one end and having a user-engageable portion at an opposed end. Upon a user exerting force on the opposed end, the hitch ball member is selectively movable between an extended use position, wherein a portion of the hitch ball member extends upwardly from the tubular sleeve, and a retracted storage position, wherein the ball portion is substantially hidden. Selective adjustment is facilitated by an inclined edge on the drive plate that slidably engages at least a portion of the hitch ball member.

19 Claims, 8 Drawing Sheets

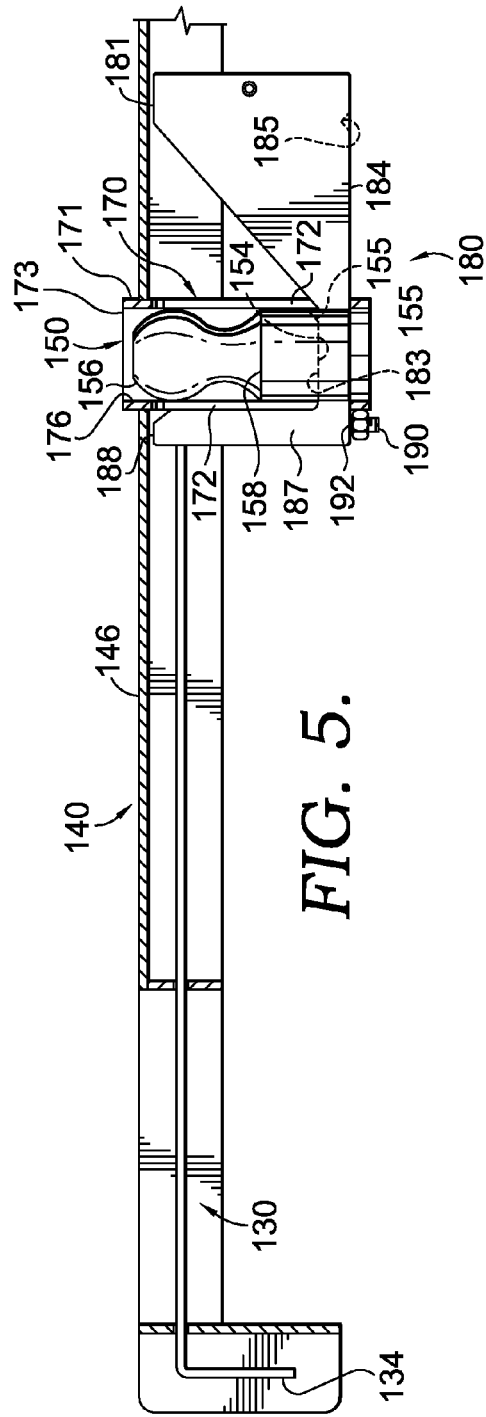
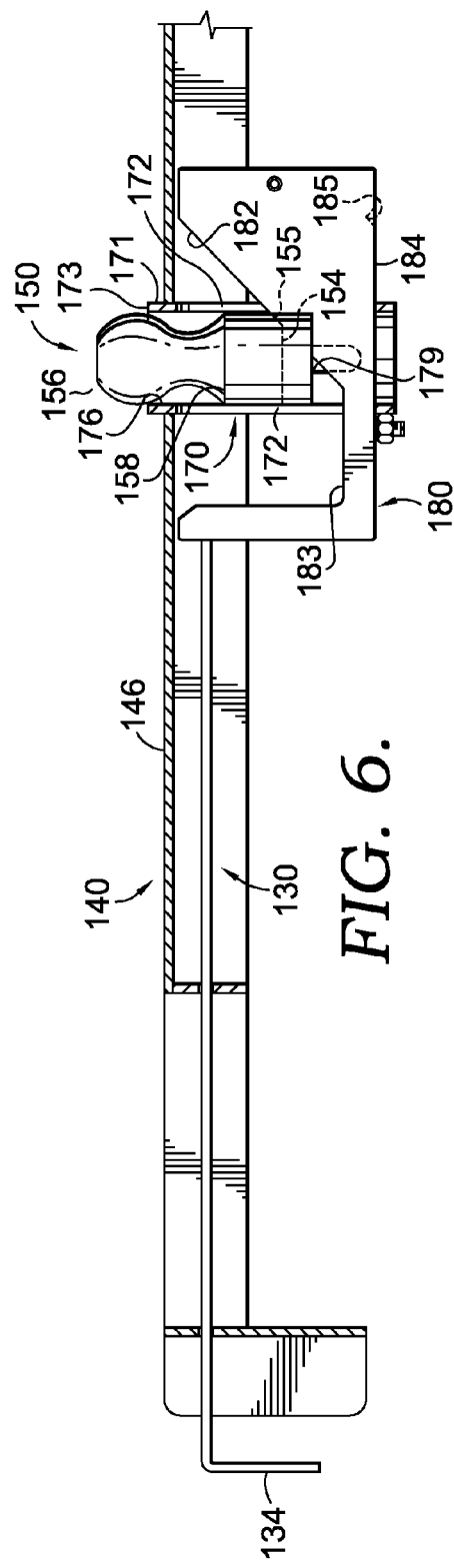

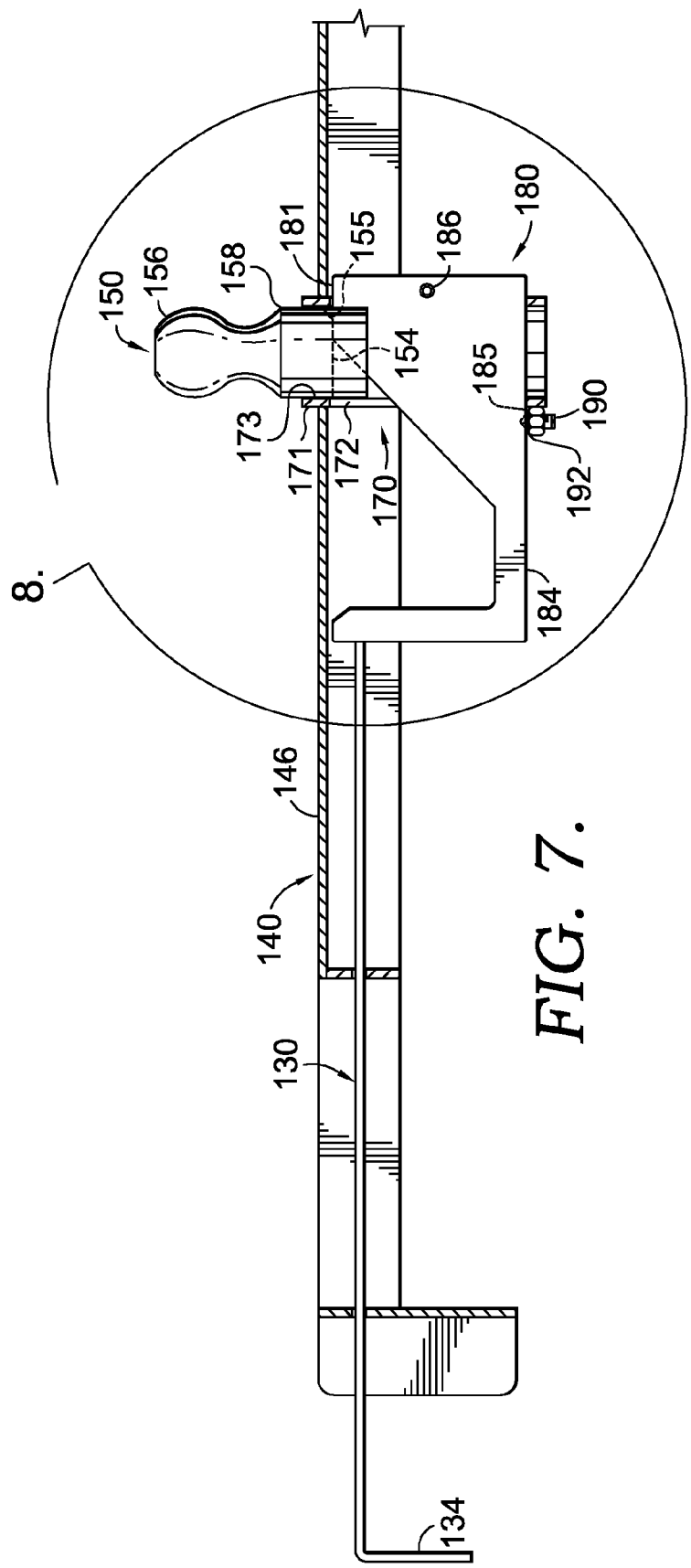

RETRACTABLE HITCH-BALL MECHANISM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to ball-style hitches located in the bed of a towing vehicle, such as a traditional pickup truck, that engage a releasable coupling on the tongue of a trailer. More particularly, this invention relates to a retractable hitch-ball mechanism that allows a user to selectively move a hitch ball from an operative position, in which a ball portion projects upwardly above the bed, to a retracted position, in which the ball portion is hidden when it is not needed for towing, thereby permitting the user to make full use of the truck's bed.

The most common method of hooking a trailer to a vehicle for towing is attaching the trailer to a hitch-ball that is mounted on or near the vehicle's rear bumper. However, by virtue of their arrangement, bumper pulled trailers are limited to a relatively small size and have severe load restrictions. A common method employed to tow larger trailers utilizes a trailer hitch arrangement where the hitch-ball is mounted in or on the floor of the vehicle bed and/or to the bed frame. In this configuration, the hitch-ball is positioned generally over, or slightly ahead of, the rear axle of the vehicle. The trailer has a long tongue portion, or gooseneck, which is curved downward and over the rearmost portion of the bed, thereby accessing the hitch-ball. Advantageously, a greater amount of load can be assumed by the vehicle because the load is passed directly onto the rear axle of the truck, instead of onto the bumper.

While hitch-ball mounting designs of this type can be found, a problem associated with this hitching arrangement is that it often requires the presence of an upwardly projecting hitch-ball mounted to the middle of the floor of the bed. Typically, the hitch-ball is permanently mounted in this position to ensure structural integrity when towing.

In the majority of these designs, mounting is accomplished by fixedly coupling the hitch-ball to a large metal plate and then bolting or welding the entire unit to the bed and/or bed frame. As such, the hitch-ball is permanently positioned in an upwardly projecting manner at a central location on the bed. This type of arrangement presents a problem in the event a user of the vehicle desires to lay large, flat, sheet goods in the bed. In that situation, the hitch-ball prevents the sheet goods from laying flat in the bed and, coincidentally, can damage the sheet goods. Additionally, if the user of the vehicle fills the bed with loose material, such as dirt or gravel, and attempts to shovel the loose material out, the upwardly projecting hitch member often interferes with the user's ability to shovel the loose material.

In an effort to solve these problems, arrangements have been devised to permit removal or adjustability of the upwardly projecting hitch-ball. However, these arrangements have inherently created additional problems for the user of the vehicle. In one situation where the hitch-ball is removable, the hitch-ball is often misplaced and, eventually, lost. In other arrangements that permit the hitch-ball to be laid or folded down on its side below the bed surface, the associated mechanism requires a large space under the bed for mounting and operational purposes. Additionally, these arrangements are costly and involve complex moving parts that easily become contaminated and frequently require repair and cleaning.

Accordingly, a solution that permits the hitch-ball to be adjusted from an operative upwardly-projecting position to another position that permits full use of the bed without the accompanying above-listed problems is desirable. The present invention provides, at least, this solution, thereby overcoming the drawbacks of the present hitch-ball arrangements.

BRIEF SUMMARY OF THE INVENTION

In order to overcome the above-stated problems and limitations, and to achieve the noted advantages, there is provided a retractable hitch-ball mechanism having a mounting frame assembly adapted to fixedly secure an adjustment-control mechanism to the bed frame of a pickup truck. The adjustment-control mechanism generally includes a housing, a hitch ball member, and a drive plate. The drive plate is selectively actuated from a remote location by a linkage. The housing includes a tubular sleeve defining a longitudinal axis. The tubular sleeve includes a pair of opposed arcuate slots that are orientated in a generally parallel-spaced relation to the longitudinal axis. The hitch ball member is slidably disposed within the tubular sleeve and moveable therein between an extended use position and a retracted storage position. The drive plate includes a profile with a distal landing, a proximal landing, and an inclined edge intermediate the distal and proximal landings. Additionally, the drive plate is received in and cooperates with a capture groove located in a lower portion of the hitch ball member for facilitating vertical adjustment of the hitch ball member. Typically, the drive plate is received by the pair of opposed arcuate slots and is laterally moveable therein. The linkage includes an end mechanically coupled to the drive plate and a user-engageable end opposed thereto. The user-engageable end extends to a control location that is spaced from the hitch ball member and which provides a user with selective operation of the drive plate.

The hitch ball member is moveable into different positions, as facilitated by the adjustment-control mechanism. In one embodiment, these positions correspond with movement of the hitch ball member between the following: an operative position, where at least a portion of the capture groove is engaged with the distal landing, and a retracted position, where at least a portion of the capture groove is engaged with the proximal landing. In addition, the drive plate is laterally moveable between a first position and second position, whereby the inclined edge engages the hitch ball member, thereby facilitating its vertical movement within the tubular sleeve.

In operation, when the user desires to make full use of the bed of the pickup truck, the hitch ball member is moved from the use position by way of the user manually pushing the user-engageable end of the linkage, thereby moving the drive plate from its first position to its second position. Subsequently, when a user desires to tow a trailer with the retractable hitch-ball mechanism, the hitch ball member is moved from the storage position by way of the user manually pulling the user-engageable end of the linkage, thereby moving the drive plate from the second position to its first position. As the drive plate is moved between its first and second positions, a portion of the capture groove is slidably engaged with the inclined edge.

Additional advantages, and novel features of the invention will be set forth, in part, in a description which follows, and, in part, will become apparent to those skilled in the art upon examination of the following, or may be learned by practice of the invention.

BRIEF DESCRIPTION OF THE SEVERAL VIEWS OF THE DRAWING

The features of then invention noted above are explained in more detail with reference to the exemplary embodiment illustrated in the accompanying drawing figures, which form a part of the specification, which are to be read in conjunction therewith, in which like reference numerals are used to denote like parts in the various views, where thicknesses and dimensions of some components may be exaggerated for clarity, and wherein:

FIG. 5 is a fragmentary, side elevational view of the adjustment-control mechanism of FIG. 4, adjusted to the storage position and portions thereof cross-sectional for clarity;

FIG. 6 is a view similar to FIG. 5, but with the adjustment-control mechanism in an intermediate position between the storage and use positions;

FIG. 7 is a view similar to FIGS. 5 and 6, but with the adjustment-control mechanism in the use position;

DETAILED DESCRIPTION OF THE INVENTION

Figure 1:
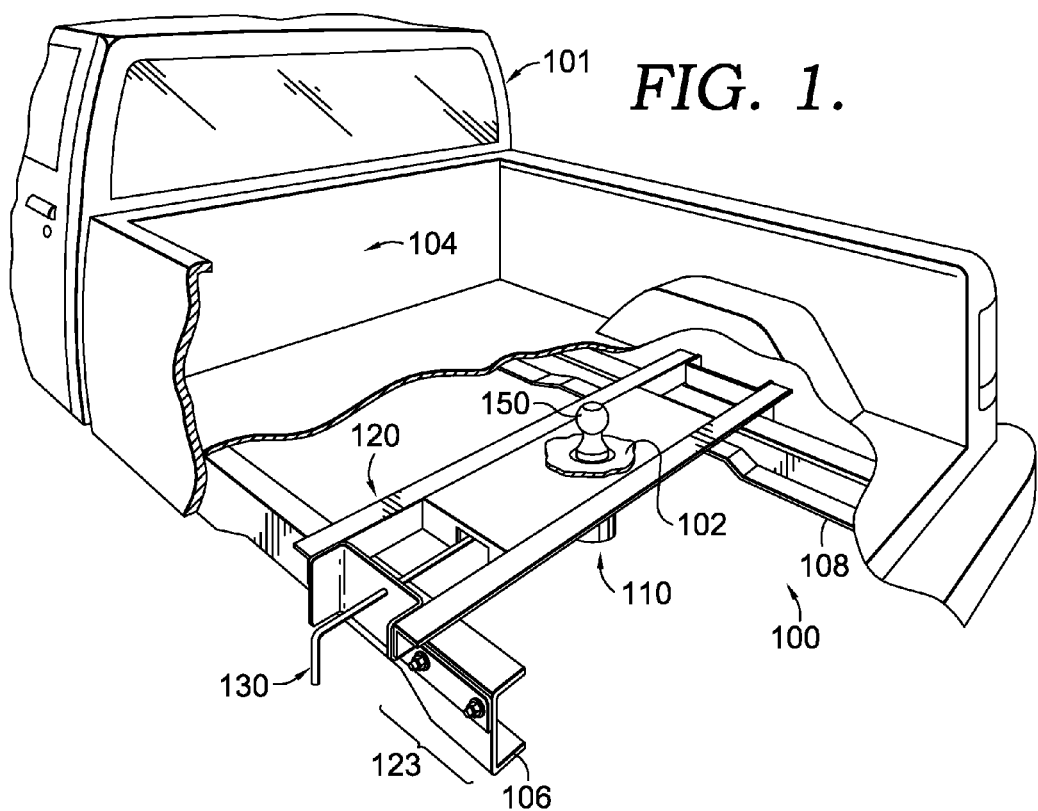
FIG. 1 is a perspective view of a retractable hitch-ball mechanism, constructed according to an embodiment of the present invention, installed in the bed of a traditional pick-up truck, where a portion of the truck has been cut away for clarity and where the hitch ball member is in the use position.

Referring now to the drawing in greater detail and initially to FIG. 1, the present invention is directed to an retractable hitch-ball mechanism (hereinafter the "mechanism"), which is shown and designated generally by reference numeral 100 and constructed in accordance with an embodiment of the present invention. The mechanism 100 broadly includes, an adjustment-control mechanism 110 that includes a hitch ball member 150, a mounting-frame assembly 120, and an activation linkage 130. The hitch ball member 150 is selectively moveable into different positions by way of the adjustment-control mechanism 110, in a manner discussed in more detail below with reference to FIGS. 5-7.

The vertical position of the hitch ball member 150 changes with lateral movement of the linkage 130. Lateral movement of the linkage 130 moves the hitch ball member 150 from a use position, in which the hitch ball member 150 extends upwardly through a floor 102 of a bed 104 of a truck 101, to a retracted storage position, in which the hitch ball member 150 is lowered below the floor 102. A perspective view of the mechanism 100 in the use position, according to one embodiment of the present invention, is shown in FIG. 1. Conversely, the hitch ball member 150 is hidden in the storage position depicted in FIG. 2.

Turning now to FIG. 1, the mechanism 100 is designed to be mounted in the bed 104 of a pickup truck 101, typically above a rear axle (not shown). In particular, the mounting-frame assembly 120 fixedly couples the adjustment-control mechanism 110 to bed frame rails 106, 108 of the bed 104. The connection between the bed frame rails, 106, 108 and the mounting-frame assembly 120 is typically made by mounting hardware or fasteners 123 that are received through a pre-formed hole pattern in the mounting-frame assembly 120, as discussed more fully below with reference to FIG. 2. The connection between the adjustment-control mechanism 110 and the mounting-frame assembly 120 is typically made by bolts (not shown) received through one or more slots 149 (see FIG. 3) on the adjustment-control mechanism 110 and one or more apertures 123 (see FIG. 3) on the mounting-frame assembly 120. Accordingly, when the mechanism 100 is mounted in the bed 104 of the pickup truck 101, the mechanism 100 is designed to lower the hitch ball member 150 below the floor 102 of the bed 104 when adjusted to the retracted position.

The connections discussed herein may comprise a welded joint, a connection by suitable fasteners, or any other method known to those of ordinary skill in the art. Embodiments of suitable fasteners may include, but are not limited to, pivot pins, traditional mounting hardware, rivets, bolt and nut combinations, or any other suitable fasteners which are well-known in the metal-fabrication industry Although the various embodiments for mounting, connecting, coupling, etc., are not discussed in relation to every subsequently mentioned element, component, and/or assembly, it should be understood that the fastener selections, and attachment procedures, above are to be applied to each. Further, it will be understood that when an element is referred to as being pivotably "coupled" to, "interconnected" with, "attached" on, etc., another element (e.g., assembly, bracket, frame, mechanism, and the like), it is contemplated that the elements may be in direct contact with each other, or other elements (such as intervening elements) may also be present. Further, the shapes of the elements may vary as desired, as may the locations of certain connections.

Looking now at the embodiment illustrated in FIG. 2, with the hitch ball member 150 in the retracted position, the mounting-frame assembly 120 will now be discussed in detail. The mounting-frame assembly 120 includes a forward transverse rail 122, a rearward transverse rail 124, a passenger-side side-mounting bracket 126, and a driver-side side-mounting bracket 128. The pair of transverse rails 122, 124 are positioned in an opposed and generally parallel spaced apart arrangement and are oriented laterally in the truck 101 bed 104. Further, the transverse rails 122, 124 provide a joist arrangement to evenly support the adjustment-control mechanism 110, and any weight applied thereon by a trailer (not shown). The transverse rails 122, 124 are typically constructed from a generally rigid material, such as steel angle iron, but could also be formed beams or square stock.

The pair of the side-mounting brackets 126, 128 are also set in an opposed and generally lateral-spaced relation. The side-mounting brackets 126, 128 are fixedly attached to the longitudinal ends of the transverse rails 122, 124 and are connected to the bed frame rails 106, 108. The connection to the bed frame rails 106, 108 may be facilitated by a preformed hole pattern 121, which receives mounting hardware therethrough. The preformed hole pattern 121 includes an arrangement of apertures, where each aperture is sized, positioned, and oriented to correspond to hole patterns that pre-exist on a variety of different pickup truck models. In one embodiment, each of the side-mounting brackets 126, 128 is shaped as mirror images of the other. In another embodiment, each of the side-mounting brackets 126, 128, is formed from metal bar stock, stamped or formed steel plate, laser-cut from sheet metal, or any other sturdy material, any of which would be suitable for use with the present invention.

Figure 2:
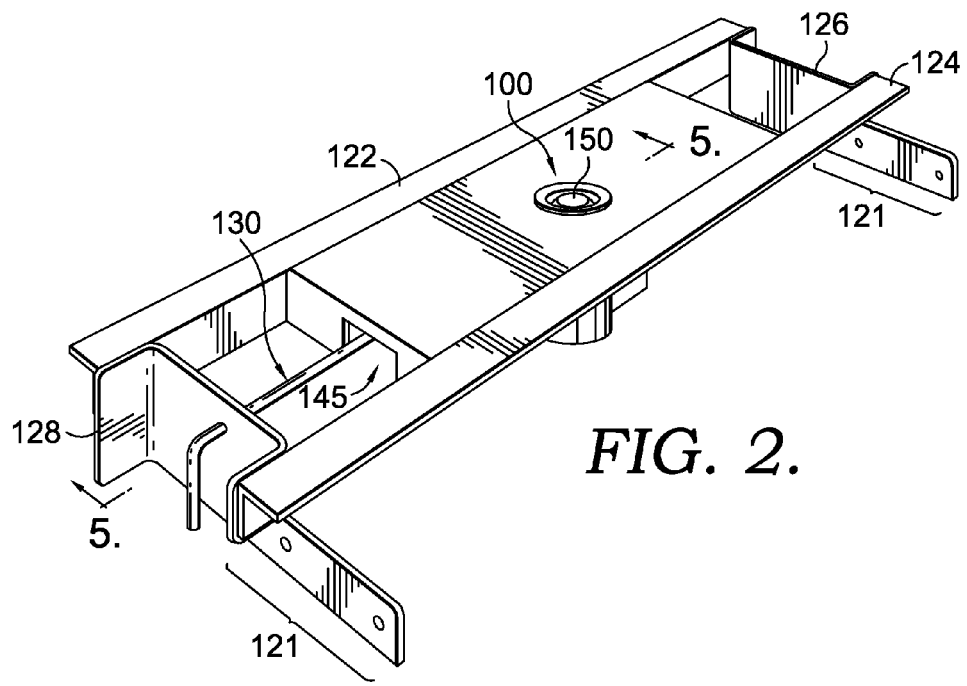
FIG. 2 is a perspective view of the retractable hitch-ball mechanism of FIG. 1 with the hitch ball member in its retracted storage position.
Figure 3:
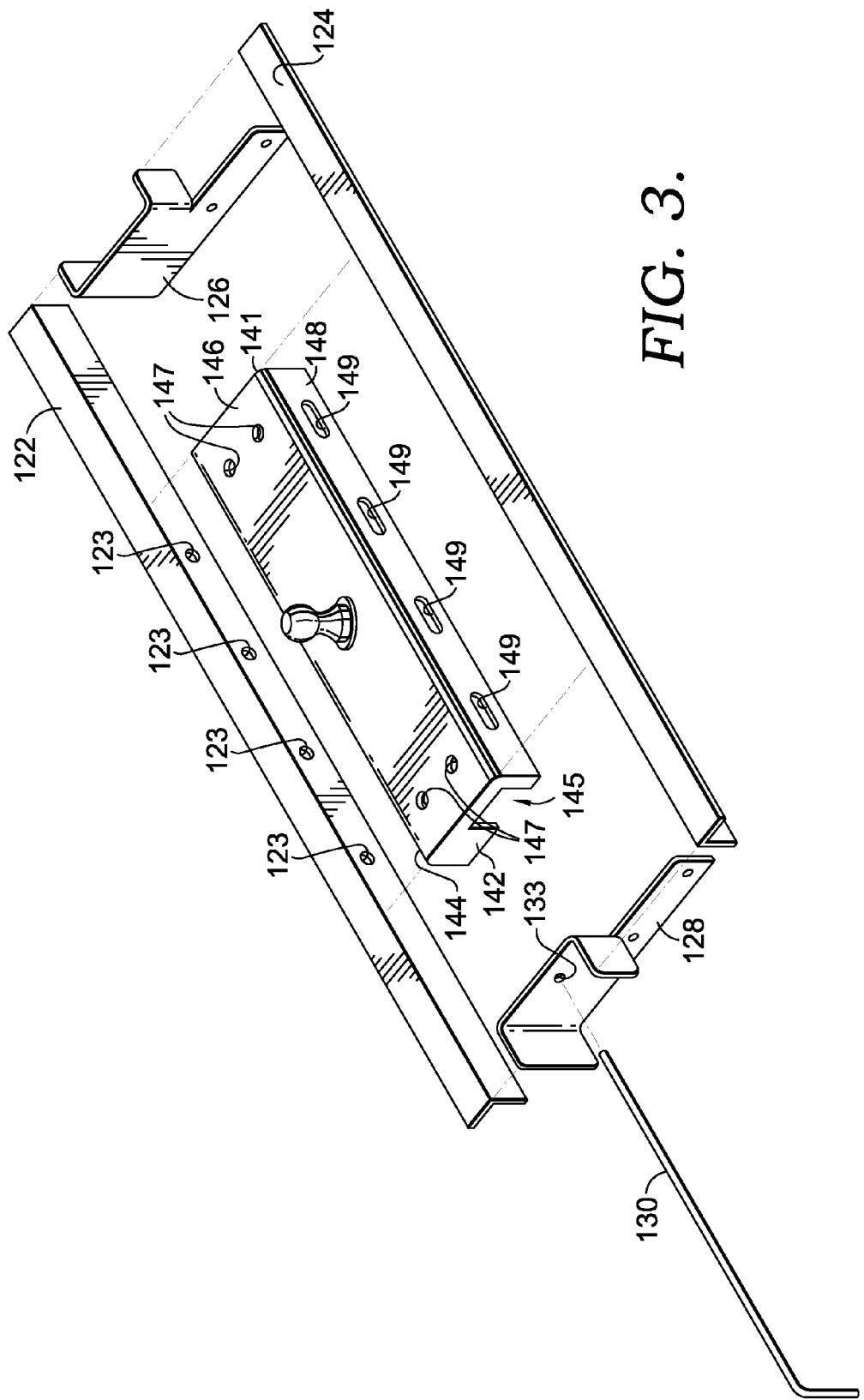
FIG. 3 is an exploded view of the retractable hitch-ball mechanism of FIG. 2.

Turning now to FIG. 3, a view similar to FIG. 2 is shown, but with the retractable hitch-ball mechanism 100 exploded into individual components and positioned in the use position. In particular, the linkage 130, the mounting-frame assembly 120 and a support structure 140 of the adjustment-control mechanism 110 are depicted. One of the pair of side-mounting brackets 126, 128 is provided with a guide hole 133 for receiving the linkage 130, which is slidably engaged therethrough. The support structure 140 includes a generally U-shaped member 144 having a pair of end plates 141, 142 positioned in a substantially parallel and spaced relation. The end plates 141, 142, are formed with a profile to mate with the U-shaped member 144, thereby increasing the rigidity of the support structure 140. Further, one or more of the end plates 141, 142 includes a cut-out section 145 for receiving the linkage 130. Accordingly, the cut-out section 145 and guide hole 133 work in cooperation to enable unimpeded adjustment of the linkage 130. It should be understood that, although depicted as an individual actuation rod, the linkage 130 may be absorbed as a component of the adjustment-control mechanism 110, or may comprise an assembly of a plurality of linkages.

The U-shaped member 144 includes a top surface 146, and at least one lateral surface 148 adapted to mount to the transverse rails 122, 124, of the mounting-frame assembly 120. Mounting is facilitated by slots 149 that are configured to receive fasteners. The top surface is optionally provided with apertures 147 that facilitate connecting the support structure 140 directly to the floor 102 of the bed 104.

The components of the adjustment-control mechanism 110 will now be discussed in detail with reference to the exploded view shown in FIG. 4. Broadly, the adjustment-control mechanism includes the support structure 140, more fully discussed above, the hitch ball member 150, a stop element 160, a housing 170, a drive plate 180, and a detent mechanism 190. The hitch ball member 150 is preferably integrally formed of a single piece of steel. The hitch ball member 150 comprises a ball portion 156, a body portion 152, and a shoulder 158 disposed therebetween. The ball portion 156 is of a shape well known in the art (i.e., spherically shaped) and is of standardized dimensions that are determined by the size of the mating releasable coupling device adapted to receive the ball portion 156 during use. Typically, the releasable coupling device is attached to a tongue, or gooseneck, extending from a trailer that is desired to be hitched to the pickup truck 101. The body portion 152 is generally cylindrical and includes a capture groove 154. In an exemplary embodiment, the capture groove 154 is machined as a slot in a lower portion of the hitch ball member 150. The dimensions of the capture groove 154 are determined and tolerated according to the size of the drive plate 180 that is slidably received therein, as discussed in detail below. The capture groove 154 may also include an angled portion 155, which is discussed in greater detail below.

In one embodiment, the stop element 160 is provided to resist accidental disengagement of the hitch ball member 150 from receipt in the housing 170. The stop element 160 may be pin-shaped bolt 164 having a shaft with a threaded engagement portion and a head 162. The threaded portion of the bolt 164 is threadably received within an internally threaded bore (not shown) in the body portion 152 of the hitch ball member 150.

The housing 170 is generally tubular in nature and, in the embodiment illustrated in the accompanying figures, is preferably cylindrical in shape. It is understood and appreciated that non-cylindrical shapes could be used as alternate shapes of the housing 170 and are within the scope of the present invention. The housing 170 has a longitudinal passage 176 therethrough. Typically, the passage 176 through the housing 170 is shaped to correspondingly with the hitch ball member 150 that is slidably received therein. In other words, the shape of the outer periphery of the body portion 152 of the hitch ball member 150 generally corresponds with the shape of the outer periphery of the passage 176 through the housing 170. In one instance, slidable engagement is facilitate when an inner diameter of the passage 176 through the housing 170 is slightly larger than an out-diameter of the body portion 152 of the hitch ball member 150.

The housing 170 is coupled with the support structure 140 of the adjustment-control mechanism 100. This can be accomplished by welding an outer surface of the housing 170 to an opening 166 of the support structure 140. In one embodiment, the cylindrical shape of the housing 170 is partially received in the opening 166 and is coupled to the support structure 140 in a generally perpendicular orientation to the top surface 146 of the support structure 140. That is, the housing 170 resides in a substantially vertical orientation in relation to the top surface 146. Optionally, reinforcement splines (not shown) are attached to the housing 170 in a radial arrangement. These splines function to, in part, fixedly couple the support structure 140 to the housing 170. Accordingly, the splines provide increased lateral support to maintain the housing's 170 angular position during towing.

In the illustrated embodiment, the housing 170 includes a tubular sleeve 171 that serves as a lateral wall having a pair of opposed arcuate slots 172 and a longitudinally-extending slot 179 therethrough. The passage 176 through the tubular sleeve 171 defines a centrally-located, longitudinal axis 175. In this embodiment, the arcuate slots 172 and the longitudinally-extending slot 179 are each oriented in a generally parallel-spaced relation to the longitudinal axis 175. In addition, the arcuate slots 172 are substantially vertically-extending openings that align with each other on opposed sides of the tubular sleeve. This alignment allows the arcuate slots 172 to receive the drive plate 180, which is laterally moveable therethrough.

Figure 9:
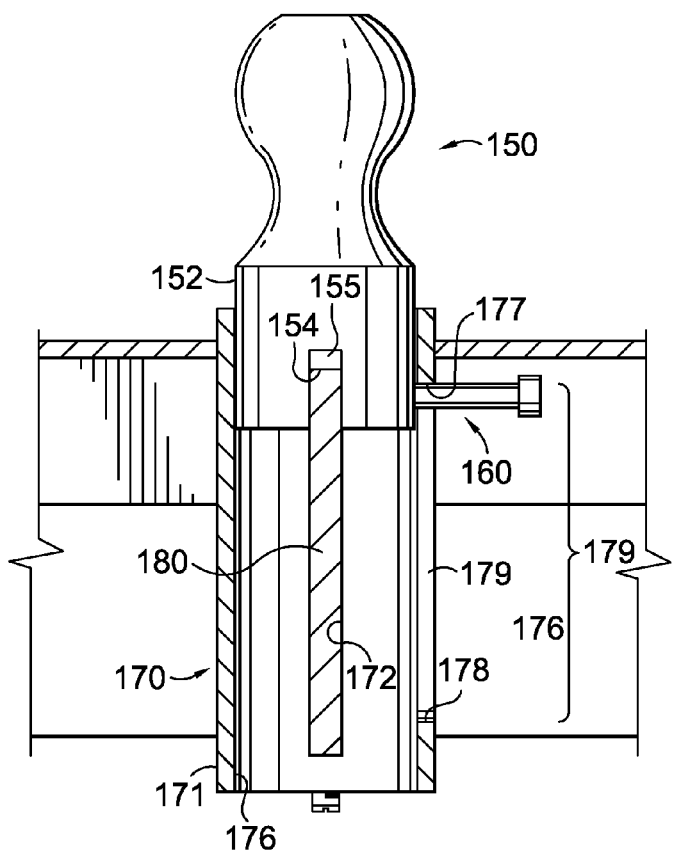
FIG. 9 is a cross-sectional view taken generally along the line 9-9 of FIG. 8.

Turning temporarily to FIG. 9, the longitudinally-extending slot 179 is a vertically extending opening through the sidewall of the housing 170 that is typically offset from either arcuate slot 172 by approximately ninety degrees with respect to the longitudinal axis 175. The slot 179 includes an upper end 177 and a lower end 178. In one embodiment, the stop element 160 extends outwardly, preferably radially, from the hitch ball member 150 and is received in the longitudinally-extending slot 179. During use, the stop element 160 travels vertically within the opening of the longitudinally-extending slot 179. If the stop element 160 establishes contact with either the upper end 177 or lower end 178 of the slot 179, the movement of the hitch ball member 150 is vertically limited. Advantageously, by restraining the upward vertical movement of the hitch ball member 150, this feature maintains at least a portion of the hitch ball member 150 in slidable engagement with the tubular sleeve 171 and, therefore is not readily removable, misplaced and, eventually, lost.

Returning to FIG. 4, the tubular sleeve 171 includes an upper edge 173 that defines a housing opening 174. The housing opening 174 is typically flush, or positioned slightly above, the floor 102 of the bed 104 of the truck 101. Because, the majority of the housing 170 is beneath the floor 102, interference with materials loaded in the bed 104 is greatly reduced. Additionally, while the housing 170 may have additional internal members within the tubular sleeve 171, it is a benefit of the present inventive design to include a minimum of components therein, as shown. Because the adjustment-control mechanism 110 is located underneath the bed 104 of a pickup truck 101, during use of the pickup truck 101, debris may enter the passage 176 through the housing opening 173 and possibly cause contamination of the mechanism 100. But, by virtue of the passage 176 providing a generally open flow path through the housing 170 to the ground, the present invention thereby reduces contamination and the associated repairs and cleaning.

Figure 10:
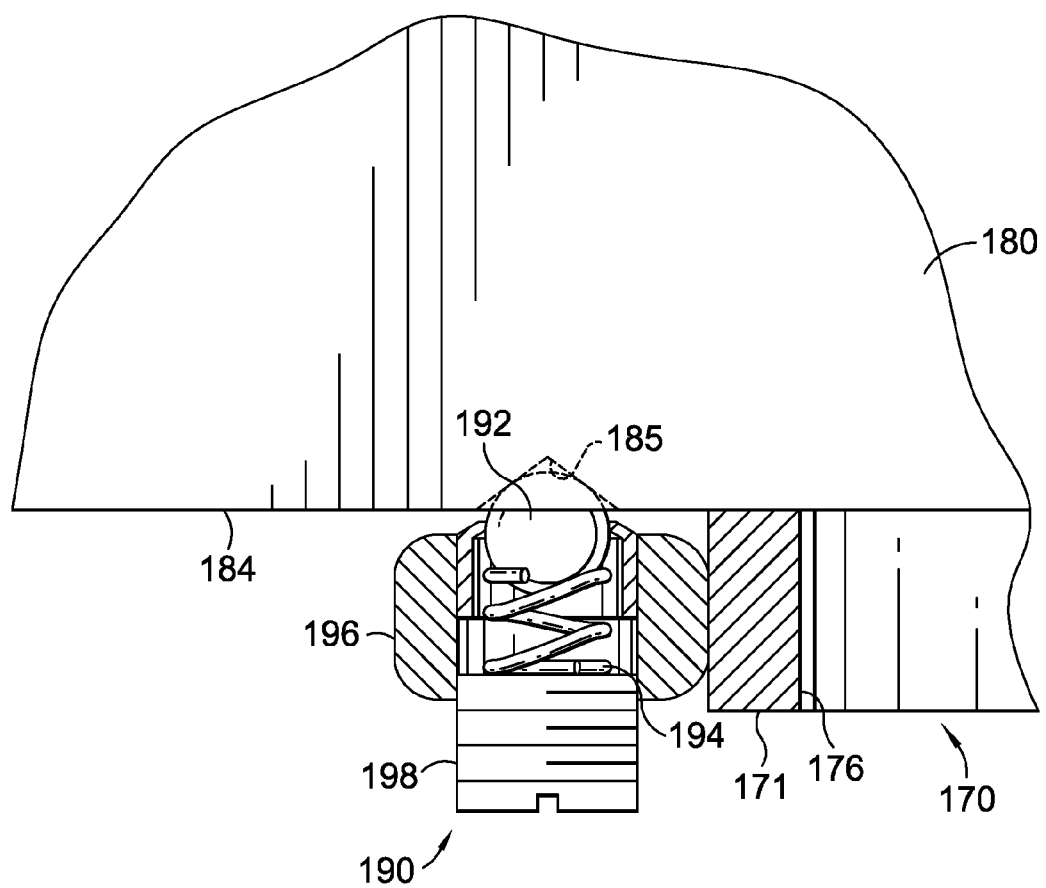
FIG. 10 is an enlarged fragmentary view taken in the area 10 of FIG. 8 and features the detent mechanism of an embodiment of the present invention.

Assembled to the housing 170, typically below one of the arcuate slots 172, resides a detent mechanism 190. Referring briefly to the enlarged partial side cross-sectional view of FIG. 10, one embodiment of the detent mechanism 190 is shown in detail. The detent mechanism 190, in the illustrated embodiment, is fixedly attached to an outer surface of the tubular sleeve 171, preferably by a welded joint. In an alternate embodiment (not shown), the detent mechanism 190 is attached to an inner surface of the tubular sleeve 171 such that the detent mechanism 190 is positioned inside the tubular sleeve 171, thereby providing protection for the detent mechanism 190. The detent mechanism 190 includes a casing 196 that houses a plunger ball 192, a spring 194, and an adjustment element 198. The casing 196 may further include a collar (not shown) to resist disassembly of the plunger 192. In one embodiment, the casing 196 may be a nut having an internally-threaded bore.

The spring 194 is intermediately disposed between the adjustment element 198 and the plunger ball 192, and is biased in a compressed state, thereby exerting an outward force against the plunger ball 192. The adjustment element 198 is typically embodied as a set screw or fastener that is threadably engaged to internal threads of the casing 196. Upon rotation of the adjustment element 198, the bias force provide by the spring 194 may be increased or, alternatively, reduced. In function, the detent mechanism 190 provides a positive locking control that resists lateral movement of the drive plate 180 when the plunger 192 and an indentation 185 on the drive plate 180 cooperate, as more fully discussed below.

Figure 4:
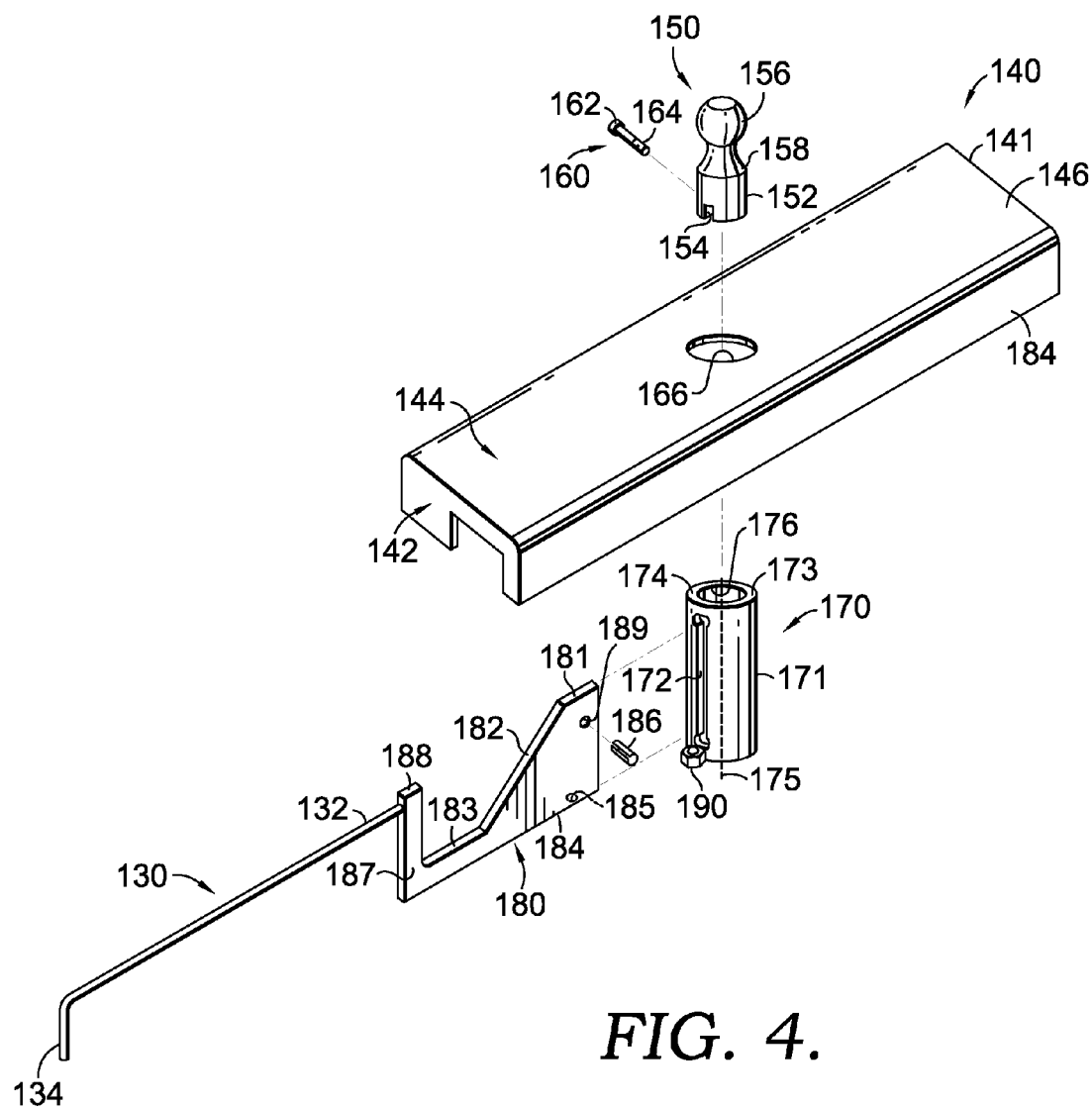
FIG. 4 is an exploded view of the adjustment-control mechanism of the retractable hitch-ball mechanism of FIG. 3.

As illustrated in FIG. 4, the drive plate 180 is preferably a plate-like member and may be formed from any standard metal plate. The drive plate 180 includes a profile with a distal landing 181, a proximal landing 183, an inclined edge 182 that is intermediately disposed between the distal landing 181 and the proximal landing 183, and a lower surface 184 that includes the indentation 185. The landings 181, 183 provide vertical support, or a seat, on which a portion of the hitch ball member 150 in the groove 154 may rest. Support is provided by transferring a downward gravitational force of the hitch ball member 150 to the housing 170 through the drive plate 180, without causing the drive plate 180 to move laterally or rotate. In the illustrated embodiment, the landings 181, 183 are substantially flat, horizontally orientated edges of the drive plate 180. In other embodiments, the landings 181, 183, may be convex and/or concave in nature to promote retention of the hitch ball member 150 thereon.

The inclined edge 182 provides a work surface or ramp upon which the groove 154 of the hitch ball member 150 is slidably engaged, typically when moving the drive plate 180 between its first and second positions. These first and second positions of the drive plate 180 correspond with the upward and downward adjustment of the hitch ball member 150 from the extended use position to the retracted storage position respectively, as facilitated by the inclined edge 182. The inclined edge 182 is depicted as a sloped, generally straight edge in the illustrated embodiment of the figures. However, it is understood and appreciated that other edge configurations exist, such as an exponentially inclining curve, which are functional in the present adjustment-control assembly 110. These configurations are contemplated as being within the scope of the present invention.

Additionally, the drive plate 180 includes an elongated section 187 that has an upper portion 188 and an aperture 189 adjacent the distal landing 181 for receiving and retaining a spring pin 186. The upper portion 188 of the elongated section 187 and the spring pin 186 are provided as stops to limit the lateral movement of the drive plate 180. This is more fully discussed below with reference to FIGS. 5 and 7. Further, the elongated section 187 is typically an extended piece of material that provides a coupling with the linkage 130.

The linkage 130 is typically an extended rod-shaped member that includes a user-engageable end 134, and a mechanically-coupled end 132 that is coupled with the elongated section 187 of the drive plate 180. This coupling may be embodied as a threaded portion on the mechanically-coupled end 132 assembled in conjunction to, and received within, an internally threaded bore (not shown) in the drive plate 180. In another embodiment, the coupling is configured as a bore in the drive plate 180 that receives the linkage 130 and a cross-drill in both the drive plate 180 and mechanically-coupled end 132 that align to receive a pin (not shown). Although two different configurations of the coupling have been discussed, it should be understood and appreciated by those of ordinary skill in the art that other methods of coupling could be used (e.g., a set screw), and that the invention is not limited to those configurations shown and described.

Figure 11:
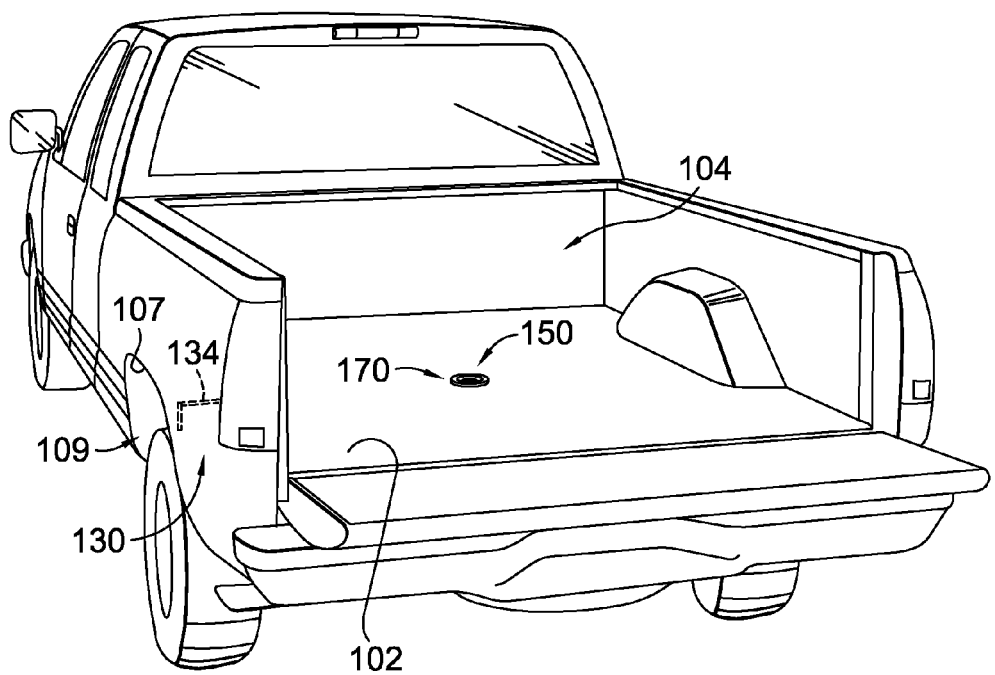
FIG. 11 is a perspective view of an embodiment the retractable hitch-ball mechanism of the present invention installed in a traditional pick-up truck and adjusted to the retracted storage position.
Figure 12:
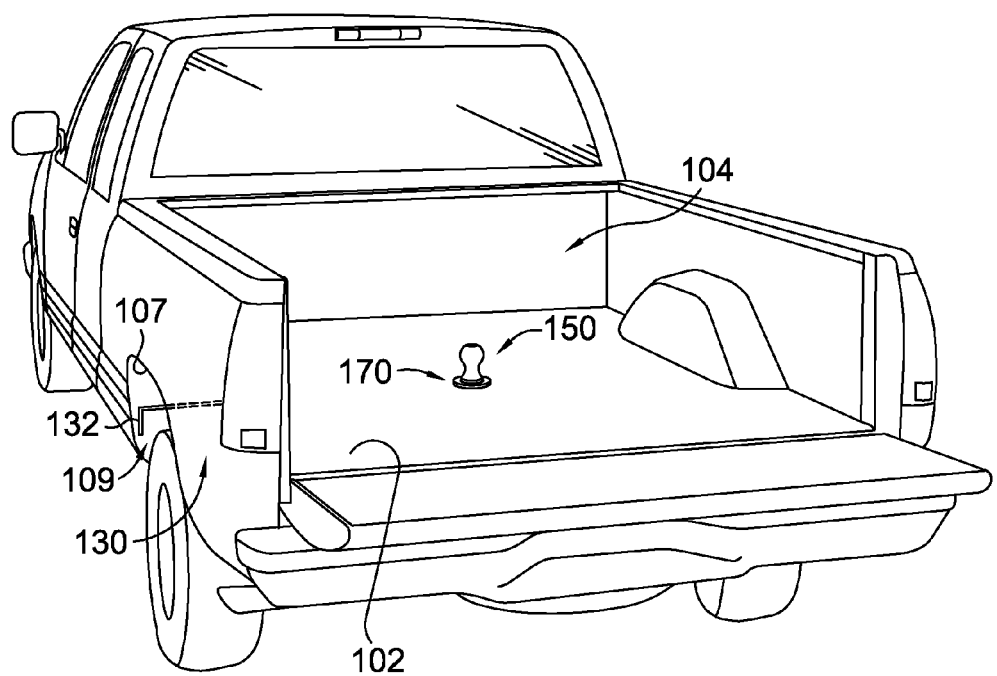
FIG. 12 is a view similar to FIG. 11, but with the retractable hitch-ball mechanism adjusted to the use position.

The user-engageable end 134 of the linkage 130 permits the user of the adjustment-control mechanism 110 to move the drive plate 180 between the first and second positions in a generally lateral direction. In one embodiment, the user manually exerts force (e.g., pushing or pulling) on the user-engageable end 134, which typically terminates in a handle, to selectively operate the drive plate 180. In another embodiment, not shown, automated assistance (e.g., motor, engine, and the like) is provided to affect movement of the drive plate 180. In the first embodiment described above, the handle may extend to a control location 109 spaced away from the adjustment-control mechanism 110 to provide the user with unimpeded remote operation capability (see FIGS. 11 and 12). In one instance, this control location 109 is a user-accessible portion of the bed 104, such as in the rear driver's side wheel well 107. This control location 109, however, may be changed depending on the user's preference.

Further, persons familiar with the field of the invention will realize that the linkage 130 may be practiced by various devices which are different from the specific illustrated embodiment. For instance, the linkage 130 may include several pivotably interconnected elements for selectively moving the drive plate 180. Or, a cable with a remotely-mounted handle may be utilized in conjunction with, or in substitute of, the linkage 130. Therefore it is emphasized that the invention is not limited only to its embodiments, but is embracing of a wide variety of mechanisms which fall within the spirit of the claims below.

Referring to FIGS. 5-7, the operation of the adjustment-control mechanism 110 will now be discussed. Initially, the hitch ball member 150 is moveable into different positions, as facilitated by the adjustment-control mechanism 110. In one embodiment, these positions correspond with movement of the hitch ball member 150 between the following: a retracted position, in which at least a portion of the capture groove 154 is engaged with the proximal landing 183, as shown in FIG. 5 and a use position, in which at least a portion of the capture groove 154 is engaged with the distal landing 181, as shown in FIG. 7. In addition, the drive plate 180 is laterally moveable between a first position (see FIG. 7) and second position (see FIG. 5), in which the inclined edge 182 engages with the capture groove 154 of the hitch ball member 150, thereby facilitating its vertical movement within the tubular sleeve 171 of the housing 170.

In operation, as shown in FIG. 5, when a user desires to tow a trailer with the mechanism 100 (see FIG. 12), the hitch ball member 150 is selectively adjusted from the retracted position within the housing 170 upon the user manually pulling the user-engageable end 134 of the linkage 130, thus, selectively moving the drive plate 180 from the second position. Particularly, the drive plate 180 is laterally moved such that a portion of the capture groove 154 of the hitch ball member 150 slides from the proximal landing 183 to the inclined edge 182 (see FIG. 6). During continued lateral movement, the inclined edge 182 rides within the capture groove 154, as illustrated in a transitional position of FIG. 6. Because the hitch ball member 150 is restrained from moving laterally by the housing 170, the lateral movement of the inclined edge 182 results in upward, or downward, movement of the hitch ball member 150. In the illustrated embodiment, where the capture groove 154 is provided with the angled portion 155, the angled portion 155 of the capture groove 154 engages the inclined edge 182 as the drive plate 180 is moved laterally between its first and second positions. The angled portion 155 is preferably oriented at an angle that corresponds with the angle of the inclined edge 182. This relationship not only provides for easier movement of the drive plate 180 between its first and second positions, but it also permits the hitch ball member 150 to be lifted in a short lateral movement of the drive plate 180. This is helpful where limited space is available under the bed 104 of modern pickup trucks 101. It should be noted, however, that the angled portion 155 could be omitted from the capture groove 154 and still be within the scope of the present invention.

Figure 8:
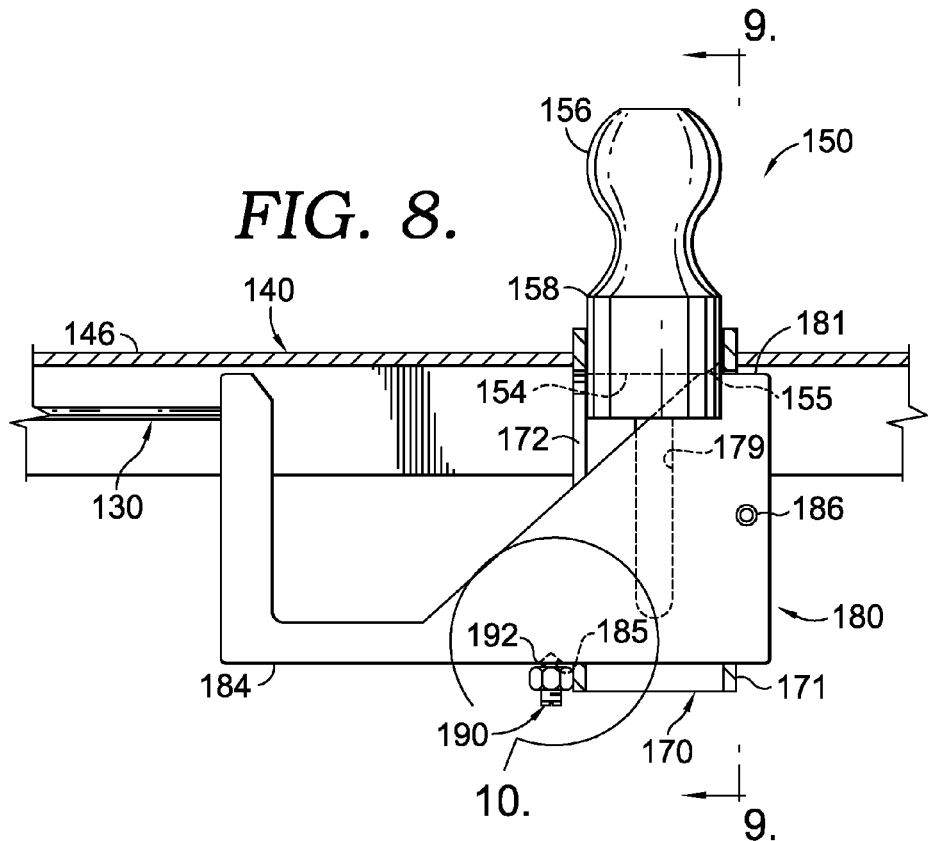
FIG. 8 is an enlarged fragmentary view taken in the area 8 of FIG. 7.

Upon reaching the use position, as shown in FIG. 7, a portion of the capture groove 154 slidably engages with the distal landing 181. The movement of the drive plate 180 continues until the spring pin 186 contacts the housing 170, thereby prohibiting continued lateral movement of the drive plate 180, and providing feedback to the user that the hitch ball member 150 has achieved full upward projection. An enlarged view of this contact is provided at FIG. 8. Coincidentally, when the spring pin 186 contacts the housing 170, the indentation 185 on the lower edge 184 is positioned over and receives the plunger ball 192 of the detent mechanism 190. Accordingly, the bias force extending the plunger ball 192 provides a locking feature that maintains the drive plate 180 in the first position during operation of the pickup truck and/or while towing (see FIG. 10).

Alternatively, when the user desires to make full use of a bed 104 of the pickup truck 101 (see FIG. 11), the hitch ball member 150 is moved from the use position by the user manually pushing the user-engageable end 134 of the linkage 130, thereby selectively moving the drive plate 180 from the first position to the second position.

Typically, the force required to push the drive plate 180 from the first position is larger than the initial pulling force, mentioned above, because the bias force of the locking feature, embodied as a detent mechanism 190, must be overcome. Upon accomplishing lateral movement of the drive plate 180, a portion of the capture groove 154 is slidably engaged with the inclined edge 182, thereby lowering the position of the hitch ball member 150 within the housing 170. Eventually, upon continued lateral force on the linkage 130, a portion of the capture groove 154 rides onto the proximal landing 183. The movement of the drive plate 180 may continue until the upper portion 188 of the elongated section 187 contacts the housing 170, thereby prohibiting continued lateral movement of the drive plate 180, and providing tangible feedback to the user that the hitch ball member 150 has been fully recessed within the housing 170. A view of this contact is provided at FIG. 5.

Many variations on the illustrated embodiments of the present invention discussed above can be made without departing from the contemplated scope thereof. For example, although the selective operation procedure is described with reference to manual operation, the present invention contemplates automated controls to create the adjustment between the operative and retracted positions. Additionally, the use of materials that reduce resistance between slidable components, although not necessary, may be provided.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated by and within the scope of the claims. It will be appreciated by persons skilled in the art that the present invention is not limited to what has been particularly shown and described hereinabove. Rather, all matter herein set forth or shown in the accompanying drawings is to be interpreted as illustrative and not limiting.

The present invention has been described in relation to particular embodiments, which are intended in all respects to be illustrative rather than restrictive. Since many possible embodiments may be made of the invention without departing from the scope thereof, it is to be understood that all matter herein set forth or shown in the accompanying drawings is to be interpreted as illustrative of applications of the principles of this invention, and not in a limiting sense. Alternative embodiments will become apparent to those skilled in the art to which the present invention pertains without departing from its scope.

What is claimed is:

1. A retractable hitch-ball mechanism comprising:
    a housing;
    a hitch ball member that is slidably disposed within the housing and moveable therein between a first position and a second position, wherein the hitch ball member includes a capture groove provided with an angled portion;
    a drive plate engaging at least a portion of the hitch ball member and being laterally movable between a first position and a second position, wherein the drive plate includes an inclined edge; and
    a linkage assembly mechanically coupled to the drive plate such that operation of the linkage assembly selectively moves the hitch ball member between the first and second positions of the hitch ball member via the drive plate, wherein the angled portion of the hitch ball member engages with the inclined edge of the drive plate during the selective movement between the first position and the second position of the hitch ball member.

2. The mechanism of claim 1, wherein the housing is tubular and arranged in a substantially vertical orientation, wherein the hitch ball member is restricted to vertical movement.

3. The mechanism of claim 2, wherein the housing comprises a circumscribing wall defining a longitudinal axis, the wall having a pair of opposed arcuate slots therein orientated in a generally parallel-spaced relationship with the longitudinal axis.

4. The mechanism of claim 3, wherein the drive plate being received in the pair of opposed arcuate slots and is laterally moveable therein.

5. The mechanism of claim 3, wherein the wall of the housing further comprises a longitudinally-extending slot orientated in a generally parallel-spaced relationship with the longitudinal axis.

6. The mechanism of claim 5, wherein the hitch ball member includes a stop element extending outwardly therefrom, the stop element being received in the longitudinally extending slot.

7. The mechanism of claim 6, wherein the longitudinally-extending slot has an upper end and a lower end and wherein an upward vertical movement of the hitch ball member is restrained upon the stop element establishing contact with the upper end.

8. The mechanism of claim 1, wherein the inclined edge engages in sliding contact with the angled portion provided within the capture groove of the hitch ball member such that the hitch ball member is moveable between the first and second positions of the hitch ball member coincident with the drive plate laterally moving between the first and second positions of the drive plate.

9. The mechanism of claim 8, wherein the drive plate further includes a lower edge, a proximal landing and a distal landing, wherein the inclined edge is intermediately disposed between the proximal and distal landings, wherein the proximal and distal landings are formed as substantially horizontal and parallel edges, wherein the proximal landing is capable of supporting the hitch ball member in the second position of the hitch ball member, and wherein the distal landing is capable of support the hitch ball member in the first position of the hitch ball member.

10. The mechanism of claim 9, further comprising a detent mechanism having a casing with an outwardly biased plunger, wherein the lower edge of the drive plate includes an indentation for receiving the plunger when the drive plate is in the first position of the drive plate, whereby the detent mechanism functions to resist lateral movement of the drive plate from the first position of the drive plate.

11. A retractable hitch-ball mechanism for assembly to a frame of a pickup truck, the retractable hitch-ball mechanism comprising:
an adjustment-control mechanism that is adapted to move a hitch ball member between an extended use position and a retracted storage position, the adjustment control mechanism comprising:
a support structure having a top surface;
a housing having a tubular sleeve that is attached to the support structure in a generally vertical orientation;
a hitch ball member slidably received in the tubular sleeve and moveable vertically therein between the use position and the storage position, wherein the hitch ball member includes a capture groove provided with an angled portion;
a drive plate engaging at least a portion of the hitch ball member and laterally movable between a first position and a second position, wherein the drive plate includes an inclined edge;
a linkage assembly mechanically coupled to the drive plate such that operation of the linkage assembly selectively moves the drive plate between the first and second positions of the drive plate, wherein the angled portion of the hitch ball member engages with the inclined edge of the drive plate during the selective movement between the use position and the storage position of the hitch ball member,
wherein the hitch ball member is in the use position when the drive plate is in the first position, and
wherein the hitch ball member is in the storage position when the drive plate is in the second position; and
a mounting frame assembly adapted to fixedly secure the adjustment-control mechanism to the frame of the pickup truck.

12. The mechanism of claim 11, wherein the hitch ball member includes a ball portion and a body portion and wherein the ball portion is adapted to engage a releasable-coupling device secured to a tongue of a trailer, thereby hitching the trailer to the pickup truck.

13. The mechanism of claim 12, wherein the body portion of the hitch ball member has a outer periphery that generally corresponds in shape to an outer periphery of a passage through the tubular sleeve of the housing.

14. The mechanism of claim 11, wherein the linkage has an end mechanically coupled to the drive plate and a user-engageable end opposed thereto and wherein the user-engageable end is configured as a handle, thereby allowing a user to selectively actuate the adjustment-control mechanism remotely.

15. The mechanism of claim 14, wherein the handle of the linkage extends into a control location that is spaced apart from the hitch ball member, thereby providing the user unimpeded operation of the adjustment-control mechanism, and wherein the control location is in a wheel well of a truck.

16. The mechanism of claim 11, wherein the mounting frame assembly further comprises:
one or more transverse rails extending laterally in relation to the bed frame of the pickup truck and wherein the one or more transverse rails is fixedly attached to the support structure of the adjustment control mechanism; and
a pair of side-mounting brackets interconnecting the one or more transverse rails and the bed frame, wherein each of the pair of transverse rails includes a preformed hole pattern therein for facilitating mounting of the mechanism to the frame of the truck.

17. A retractable hitch-ball mechanism having a mounting frame assembly adapted to fixedly secure the retractable hitch-ball mechanism to the frame of a pickup truck, the mechanism comprising:
a housing having a wall defining a generally vertical passage through the housing and a central longitudinal axis, wherein the wall has a pair of opposed arcuate slots therethrough, and wherein the pair of opposed arcuate slots are orientated in a generally parallel-spaced relationship with the longitudinal axis;
a hitch ball member having a capture groove, the hitch ball member being slidably received within the passage and moveable therein between a use position and a storage position;

a drive plate having a lower edge, a distal landing, a proximal landing, and an inclined edge, wherein the inclined edge is intermediately disposed between the distal and proximal landings, wherein the distal and proximal landings are formed as substantially horizontal and parallel edges, wherein the drive plate is partially received in the capture groove of the hitch ball member and is selectively movable between a first position and a second position, wherein the proximal landing is capable of supporting the hitch ball member in the storage position, and wherein the distal landing is capable of support the hitch ball member in the use position, and wherein the drive plate is received in the pair of opposed arcuate slots and is laterally moveable therein; and a linkage having an end mechanically coupled to the drive plate and a user-engageable end opposed thereto, the user-engageable end extending to a control location spaced from the hitch ball member providing a user remote operation of the mechanism.

18. The mechanism of claim 17, wherein the hitch ball member is moved from the use position upon a user manually pushing the user-engageable end of the linkage, thereby selectively moving the drive plate from the first position, whereby a portion of the capture groove is slidably engaged with the inclined edge.

19. The mechanism of claim 17, wherein the hitch ball member is moved from the storage position upon a user manually pulling the user-engageable end of the linkage, thereby selectively moving the drive plate from the second position, whereby a portion of the capture groove is slidably engaged with the inclined edge.

* * * * *